US006714851B2

(12) United States Patent
Hrovat et al.

(10) Patent No.: US 6,714,851 B2
(45) Date of Patent: Mar. 30, 2004

(54) METHOD FOR ROAD GRADE/VEHICLE PITCH ESTIMATION

(75) Inventors: Davorin David Hrovat, Ann Arbor, MI (US); Hongtei Eric Tseng, Canton, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 165 days.

(21) Appl. No.: 10/040,806

(22) Filed: Jan. 7, 2002

(65) Prior Publication Data

US 2003/0130778 A1 Jul. 10, 2003

(51) Int. Cl.⁷ .............................................. G06F 19/00
(52) U.S. Cl. ......................... 701/70; 701/45; 340/440
(58) Field of Search ................................. 701/1, 45, 46, 701/70; 180/282; 280/735; 340/429, 440

(56) References Cited

U.S. PATENT DOCUMENTS

| | | | |
|---|---|---|---|
| 4,872,116 A | | 10/1989 | Ito et al. |
| 5,311,431 A | | 5/1994 | Cao et al. |
| 5,627,756 A | | 5/1997 | Fukada et al. |
| 5,676,433 A | | 10/1997 | Inagaki et al. |
| 5,742,918 A | | 4/1998 | Ashrafi et al. |
| 5,742,919 A | | 4/1998 | Ashrafi et al. |
| 6,002,974 A | * | 12/1999 | Schiffmann .................. 701/36 |
| 6,002,975 A | * | 12/1999 | Schiffmann et al. .......... 701/36 |
| 6,038,495 A | * | 3/2000 | Schiffmann .................... 701/1 |
| 6,192,305 B1 | * | 2/2001 | Schiffmann .................. 701/45 |
| 6,263,261 B1 | * | 7/2001 | Brown et al. ................... 701/1 |
| 6,292,759 B1 | * | 9/2001 | Schiffmann ................. 702/151 |
| 6,338,012 B2 | * | 1/2002 | Brown et al. ................... 701/1 |
| 6,556,908 B1 | * | 4/2003 | Lu et al. ........................ 701/38 |
| 2002/0095244 A1 | * | 7/2002 | Rhode et al. ................... 701/1 |
| 2003/0065430 A1 | * | 4/2003 | Lu et al. ........................ 701/45 |

* cited by examiner

Primary Examiner—Gary Chin
(74) Attorney, Agent, or Firm—Gregory P. Brown

(57) ABSTRACT

A control system (13) for an automotive vehicle (10) includes a longitudinal accelerometer (24) that generates a longitudinal acceleration signal corresponding to a longitudinal acceleration of a center of gravity (COG) of the vehicle body. A lateral velocity sensor (22) generates a lateral velocity signal corresponding to the lateral velocity of the vehicle body. A controller (14) is coupled to the yaw rate sensor (18), the longitudinal accelerometer (24) and the lateral velocity sensor (22). The controller (14) determines a longitudinal speed from the longitudinal acceleration signal. The controller determines a vehicle pitch angle in response to the longitudinal speed, the yaw rate signal and the lateral velocity signal.

20 Claims, 1 Drawing Sheet

METHOD FOR ROAD GRADE/VEHICLE PITCH ESTIMATION

TECHNICAL FIELD

The present invention relates generally to a method for detecting a road grade or pitch angle being experienced by a moving vehicle. More particularly, the present invention relates to a method for detecting the road grade angle under dynamic lateral operating conditions for use in a motor vehicle having a vehicle dynamics control system.

BACKGROUND

Automotive vehicles with braking systems which respond to vehicle conditions as well as driver input have been produced. For example, when a particular yaw rate is desired, as indicated by a driver's steering wheel operation, if the vehicle is not producing an adequate yaw rate, the braking system or steering system of the vehicle may compensate by altering a particular wheel speed or steering angle, respectively. This control is dependent on accurate measurement of several vehicle operating conditions.

One important condition is the pitch of the vehicle which corresponds to the pitch of the road. The pitch angle of the vehicle is the angle or corresponding front to rear change in elevation of the vehicle. Because this parameter may not easily be directly measured, it can be improved by inferring or calculating from other signals available in the vehicles. Because the vehicle is operated under a wide variety of conditions, calculations made from the various sensors may vary in accuracy. For example, steady straight or steady state turning may result in varied accuracy. The pitch determination may be used in various safety systems within the vehicle.

It would be desirable to provide a method for determining a pitch angle experienced by a motor vehicle that is robust to dynamic lateral vehicle operating conditions under a wide variety of maneuvers while providing an indication as to the accuracy at the given time.

SUMMARY OF THE INVENTION

There is disclosed herein a method for detecting a pitch angle experienced by a motor vehicle. The method comprises the steps of:

generating a longitudinal velocity signal corresponding to a longitudinal velocity of the vehicle;

generating a derivative signal corresponding to a derivative of said longitudinal velocity;

generating a yaw rate signal corresponding to vehicle yaw rate;

generating a lateral velocity signal corresponding to the lateral velocity of the vehicle; and determining a vehicle pitch angle based in response to said derivative signal, said yaw rate signal and said lateral velocity signal.

In a further aspect of the invention, a control system for an automotive vehicle includes a longitudinal accelerometer that generates a longitudinal acceleration signal corresponding to a longitudinal acceleration of a center of gravity (COG) of the vehicle body. A lateral velocity sensor/observer generates a lateral velocity signal corresponding to the lateral velocity of the vehicle body. A controller is coupled to the yaw rate sensor, the longitudinal accelerometer and the lateral velocity sensor. The controller determines a longitudinal speed from the longitudinal acceleration signal. The controller determines a vehicle pitch angle in response to the longitudinal speed, the yaw rate signal and the lateral velocity signal.

One advantage of the invention is that a pitch angle may be derived from the various sensors while also providing an indication of pitch angle error. Another advantage of the invention is that calibration of the system sensors may also be performed using the teachings of the present invention.

Other aspects and features of the present invention will become apparent when viewed in light of the detailed description of the preferred embodiment when taken in conjunction with the attached drawings and appended claims.

DESCRIPTION OF THE PREFERRED EMBODIMENT

Figure 1:
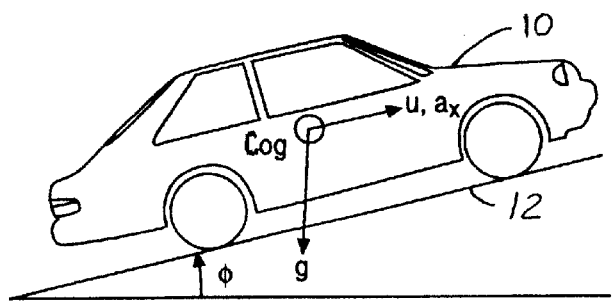
FIG. 1 is a front view of a motor vehicle illustrating various operating parameters of a vehicle experiencing a pitched road surface.

In the following figures the same reference numerals will be used to identify the same components. The present invention is preferably used in conjunction with a rollover control system for a vehicle. However, the present invention may also be used with other safety systems including deployment devices such as airbag or roll bar or other vehicle control systems such as a stability control system. The terms pitch angle and road grade angle are interchangeable when the vehicle wheels are on the road without significant suspension motion.

The method according to the present invention is intended for use with yaw control systems which are typically implemented with electronically controlled hydraulically actuated or electrically actuated braking systems in automobiles, however, the invention could easily be adapted for use in yaw control systems or vehicle dynamics related active chassis systems on other automotive vehicles, such as trains and construction equipment.

Figure 2:
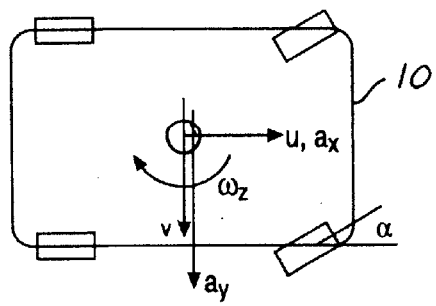
FIG. 2 is a top view of a motor vehicle illustrating various operating parameters of a vehicle experiencing a turning maneuver on a pitched road surface.

Referring now to FIGS. 1 and 2, various operating parameters and variables used by the present invention are illustrated as they relate to the application of the present invention to a ground based motor vehicle 10 on a road surface pitched by an angle θ from the horizontal. When the vehicle travels on the road the vehicle pitch corresponds to the road grade. Those skilled in the art will immediately recognize the basic physics represented by these illustrations, thereby make the adaptation to different types of vehicles easily within their reach. These parameters will be described in greater detail below.

In general, the center of gravity (COG) of the vehicle is illustrated. The longitudinal velocity u is the speed of the vehicle in the longitudinal direction. The longitudinal acceleration a is also illustrated in the same direction. The lateral velocity v and acceleration a is also illustrated extending from the center of gravity of the vehicle. A yaw moment $\omega_z$ is illustrated about the vertical access of the vehicle. Roll angle (not illustrated) is the movement of the vehicle about the longitudinal axis of the vehicle.

Figure 3:
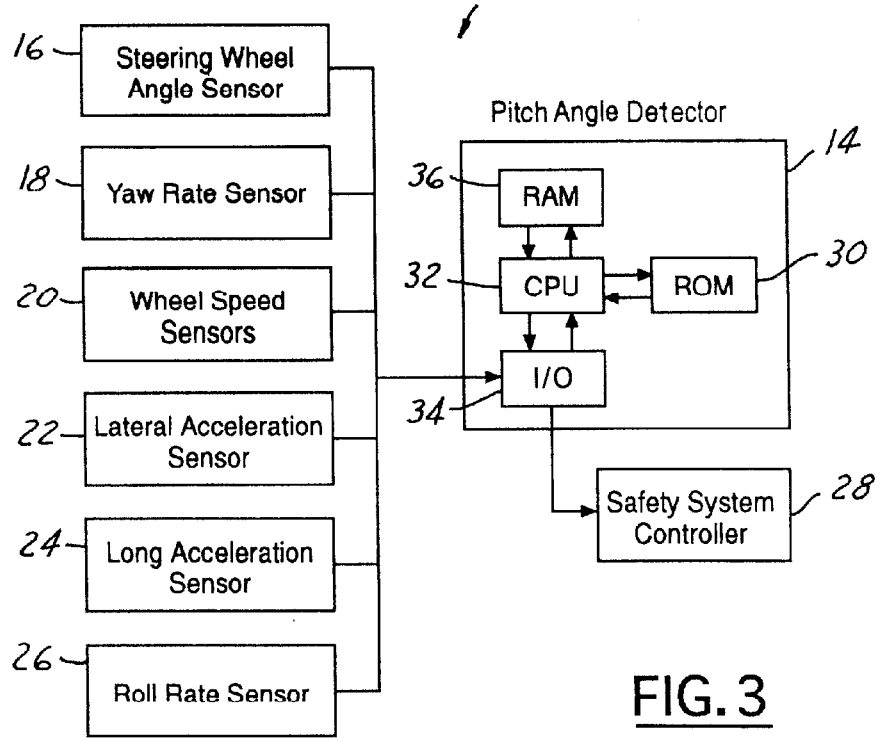
FIG. 3 is a block diagram showing a portion of a microprocessor interconnected to sensors and controlled devices which may be included in a system according to the present invention.

Referring now to FIG. 3, the component parts of a control system 13 in which the present invention has been implemented successfully. Accordingly, a control module 14 receives inputs from steering wheel angle sensor 16, yaw sensor 18, wheel speed sensors 20, lateral acceleration sensor 22, lateral acceleration sensor 24 and a roll rate sensor 26. Although not illustrated, other sensors and accelerometers could be employed in addition to, or as substitutes for those illustrated, depending upon the system being controlled and the available system sensor set while still making use of the present invention. As an example, the present invention preferably uses at minimum a longitudinal acceleration sensor 24, yaw rate sensor 18 and vehicle speed sensor. Performance may be enhanced by the other sensors.

As previously noted, an exemplary application of the present invention includes a braking system having active yaw control capability. For instance, a vehicle equipped with an active yaw control capable electronically controlled hydraulic braking system would include a hydraulic control unit operatively connected to brake actuators in cooperation with wheel and tire assemblies. The hydraulic control unit and brake actuators may be constructed in a known manner such as that commonly employed on Ford Motor Company vehicles equipped with ABS brakes in use today.

In the preferred embodiment the sensors are located at the center of gravity of the vehicle. Those skilled in the art will recognize that the sensor may also be located off the center of gravity and translated equivalently thereto.

Those skilled in the art will appreciate in view of this disclosure that wheel speed sensors 20 could comprise any of a variety of devices or systems employed in automotive vehicles for determining individual wheel speeds as well as a longitudinal velocity of the vehicle. One type of automotive speed sensor suitable for use with the present invention comprises a wheel speed module for receiving input from multiple wheel speed sensors adapted to indicate the speed of the individual wheels. The speed module derives a longitudinal vehicle speed signal by combining the signals from the individual wheel speed sensors. One such type of speed signal module is embodied in brake control modules presently used in Ford Motor Company vehicles. The individual wheel speeds are ascertained using pulse generators disposed at each wheel.

Lateral acceleration, roll orientation and speed may be obtained using a global positioning system (GPS). If GPS information is available, the global road grade/vehicle pitch angle can further be measured with two GPS antennas (with a front/rear configuration).

Roll rate sensor 26 may sense the roll condition of the vehicle based on sensing the height of one or more points on the vehicle relative to the road surface.

Roll rate sensor 26 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in an act of air suspension, a shock absorber sensor such as a load cell, a strain gauge, the steering system absolute or relative motor load, the steering system pressure of the hydraulic lines, a tire laterally force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 26, the yaw rate sensor 18, the lateral acceleration sensor 22, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

The control module (controller) 14 of control system 13 may output commands in response to the pitch rate to a safety system 28 such as a brake controller which directly commands the hydraulic control unit and indirectly controls the individual brake actuators, an airbag or a steering actuator. Also, other vehicle components such as a suspension control may be used to adjust the suspension to prevent rollover.

Those skilled in the art will appreciate that a processor within the control module 14 and its associated peripheral equipment could be structured according to several different architectures. In a preferred embodiment, however, the processor is configured so that a control program is sequentially read for each unit command from a read-only memory (ROM) 306 which stores preset control programs. Unit commands are executed by a central processing unit (CPU) 32. The processor integrally includes an input-output control circuit (I/O) 34 for exchanging data with external devices and a random access memory (RAM) 36 for temporarily holding data while the data are being processed.

Referring to FIGS. 1–4, the present invention is used to obtain road grade/vehicle pitch estimation for a vehicle equipped with longitudinal accelerometer, yaw rate sensor, and vehicle speed sensor. The performance can further be improved with additional sensors such as steering wheel sensor, lateral accelerometer, and roll rate sensor as will be described below.

Figure 4:
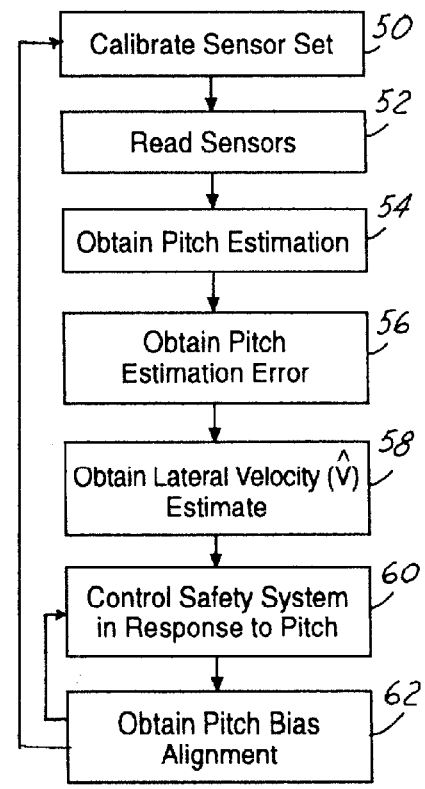
FIG. 4 is a logic flow block diagram in accordance with the present invention.

Referring now to FIG. 4, the proposed methodology utilizes a dynamic equation and provides the needed signals in the equation.

The methodology generally includes:
1. Obtaining a road grade/vehicle pitch estimation whose estimation error is bounded.
2. Obtaining a magnitude estimate for the accuracy of the road grade/vehicle pitch estimate.
3. Obtaining the information of pitch bias/alignment between a vehicle sensor set and the vehicle.

The present invention is centered around the utilization of the equation:

$$\dot{u} = a_x + rv - g \sin \theta \qquad (1)$$

where u, longitudinal speed (i.e. speed with respect to vehicle longitudinal axis) and its derivative $\dot{u}$ are derived from the wheel speed sensors;

$a_x$, longitudinal acceleration, is provided by the longitudinal accelerometer 24;

r, yaw rate is obtained from yaw rate sensor 18 or estimated from an observer;

v, lateral velocity, is provided from a vehicle model or estimated from an observer as is described blow; and θ, the combined vehicle pitch/road grade angle, is to be estimated.

As will be further described below, prior to beginning the pitch angle determination, step 50 may be performed in which the sensor set may be calibrated. Calibration may be an ongoing process or, for example, performed at predetermined times throughout the spectrum of the vehicle.

In step 52, the various sensors are read. The vehicle speed, u, and its derivative u̇ can be obtained through wheel speed sensors and a filtering process as is well known in the art. Longitudinal acceleration, $a_x$, can be obtained from the longitudinal accelerometer.

While most of the variables in Equation 1 can be directly measured, v, the lateral velocity, is usually not directly measured and difficult to obtain accurately. The lateral velocity v can be derived from the lateral acceleration sensor so that an estimate of the vehicle pitch angle can be determined in step 54.

Therefore, for the pitch angle to be useful in calculations used by various safety devices in the vehicle, the uncertainty reflected in estimated pitch angle must be quantified when less than accurate lateral velocity information is available.

The estimated pitch angle $\hat{\theta}$ and thus the pitch angle error in step 56 can be derived from equation (1) as follows:

$$\sin \hat{\theta} = (a_x - \dot{u} + r\hat{v})/g = (a_x - \dot{u} + rv)/g + rv_n/g$$

or $$\sin \hat{\theta} = \sin \theta + rv_n/g$$

where $v_n$ is the estimation error of the lateral velocity, $$v_n = v - \hat{v}$$

To estimate the pitch angle error magnitude, consider the lateral acceleration in steady state, $a_{y,ss} = ru$, and $$\sin \hat{\theta} = \sin \theta + (a_y/u) \cdot (v_n/g) = \sin \theta + (a_y/g) \cdot (v_n/u)$$

That is, the pitch estimation error will always be smaller than the vehicle side slip estimation ($v_n/u$) error assuming $|a_y| < g$. Since a vehicle usually experiences less than 1 g cornering force even on hi-mu surfaces, the estimation error is reasonable even in dynamic maneuvers assuming a reasonable vehicle side slip angle estimation error can be obtained.

While the vehicle side slip estimation is difficult to obtain accurately, its magnitude of possible error is usually maneuver dependent and can be predicted based on steering wheel, vehicle speed, and yaw rate/lateral acceleration information. Therefore, the magnitude of pitch estimation error can be projected as $$(a_y/g) \cdot ((\text{projected error in } v_n)/u)$$

Another possibility is to use a pre-calibrated constant based on vehicle tests. One pre-calibrated value is possible to accommodate all road conditions (e.g. hi and low mu) since $a_y$ decreases on low mu (due to physical limitations) and as a result the term in the above equation remains relatively constant even with larger $v_n$. In general, side slip angle estimation is more difficult on low mu surfaces than high mu.

In step 58, the lateral velocity estimate, $\hat{v}$, is obtained. The use of a lateral velocity observer based on vehicle speed, steering input, yaw rate and/or lateral accelerometer may be used. An "observer" refers to the assymptotic observer theory known to those in the art. Roll rate measurement can also be used to improve the lateral velocity. For example, one can apply the methodology suggested in U.S. Pat. No. 5,742,919, "Method and apparatus for dynamically determining a lateral velocity of a motor vehicle" which is hereby incorporated by reference. Another method is disclosed in U.S. patent application Ser. No. 09/713,712 entitled "Method and apparatus for determining lateral velocity of a vehicle" which is also hereby incorporated by reference.

A (bicycle) vehicle model is an alternative to provide a reference lateral velocity that is based on vehicle speed and steering input, also in a known manner.

In step 60, the above equations quantify the estimate uncertainty of estimated pitch/grade. This quantity can be incorporated in a vehicle controller such as a safety system controller 28 to assist control in making decision involving the pitch/grade information. The projected side slip estimation error can be determined based on vehicle maneuver and observer confidence.

In step 54 it was assumed that the sensor measurement of $a_x$, the longitudinal acceleration, has been calibrated. This invention also provides a way of calibrating the longitudinal acceleration by estimating the pitch bias/alignment of the sensor/vehicle configuration. The pitch bias/alignment information may be obtained in step 62. The pitch bias alignment is continuously updated and is a factor in the calibration of sensor set in step 50 and control safety system step 60. The pitch bias/alignment may be performed as part of step 50 above in which the sensor set is calibrated. Several assumptions must be made. First, is that the sensors are mounted on a bracket and share the same alignment between the sensor set and the vehicle. The second is that the road grade/vehicle pitch angle θ is small (<15 degree) such that cos θ≈1. Lastly, The vehicle roll/road bank angle θ is small (<15 degree) such that cos φ≈1.

The roll rate of inertial frame $\dot{\Phi}$ is zero during lateral dynamics steady state. Using the roll rate, $\omega_x$, and yaw rate, $\omega_z$, measurements from the on-board sensors and the following signal relation $$\dot{\Phi} \approx \omega_x + \tan \theta \cdot \omega_z$$

Thus, $$\tan \theta \approx -\omega_x/\omega_z$$

during steady state in lateral vehicle dynamics.

It should be noted that the Φ is the total vehicle roll angle, i.e., inertial roll angle, and θ is the vehicle (inertial) pitch angle.

The determination of the steady state can be obtained from the information of lateral acceleration, possibly with a simple spring/damper suspension model. It can also be obtained from yaw rate or steering wheel angle information with additional vehicle model.

The pitch angle θ obtained is the pitch angle alignment between the roll and yaw rate sensors. With the assumption that cos θ≈1, this pitch angle represents the inertial pitch angle of the on-board sensor. This information can be used to calibrate on-board sensor alignment as in step 50. The sensor orientation of roll and yaw rate sensor, as well as any other on-board sensors who are aligned with these two sensors such as longitudinal and lateral acceleration sensors may be calibrated.

The long term average of the obtained pitch angle above may be used to determine pitch alignment drift/bias of the sensor set, a value depends on the vehicle configuration and/or loading contitions. This obtained sensor set pitch (mis) alignment information can be used to calibrate the roll rate measurement bias obtained in Equation (1) during dynamic maneuvers. This is important because the roll rate measurement bias during a turn, as shown in the equation, $\dot{\Phi} \approx \omega_x + \tan\theta \cdot \omega_z$, is dependent on the inertial pitch angle containing the alignment pitch angle that is ignored in Equation (1). A control system that responds to measured roll rate signal, for example, will behave differently without the alignment information and may experience sensitivity/robustness issues. The change between the θ in the previous equation and Equation (1) can be used to determine an adjustment signal. Adjustment signal is used as a broad term to encompass one or more signals used to adjust the signals obtained from the various sensors. In Equation 1, the bias corresponding to the alignment pitch angle of a longitudinal accelerometer is usually compensated/eliminated during vehicle cycles.

It should be noted that road grade information can also be calibrated with powertrain torque information which is available from Engine/Powertrain ECU. For example, with torque and speed information as well as inertia information, the extra powertrain torque needed during an uphill climbing event can be calculated and translated into road grade information. As such, the orientation of a longitudinal acceleration can be calibrated in step 50 above.

While particular embodiments of the invention have been shown and described, numerous variations and alternate embodiments will occur to those skilled in the art. Accordingly, it is intended that the invention be limited only in terms of the appended claims.

What is claimed is:

1. A method of detecting a vehicle pitch angle for use in stability control system for a motor vehicle, said method comprising the steps of:
   generating a longitudinal speed signal corresponding to a longitudinal speed of the vehicle;
   generating a longitudinal acceleration signal corresponding to a longitudinal acceleration of the vehicle;
   generating a derivative signal corresponding to a derivative of said longitudinal speed;
   generating a yaw rate signal corresponding to vehicle yaw rate;
   generating a lateral velocity signal corresponding to the lateral velocity of the vehicle; and
   determining said vehicle pitch angle in response to said derivative signal, said yaw rate signal and said lateral velocity signal.

2. A method as recited in claim 1 wherein said step of determining a vehicle pitch angle is performed in accordance with the equation $$\dot{u} = a_x + rv - g\sin\theta$$

where u is the longitudinal speed and $\dot{u}$ is the derivative of the longitudinal speed u,
g is a gravity constant,
$a_x$ is the longitudinal acceleration, r is the yaw rate, v is the lateral velocity, and
θ is the vehicle pitch angle.

3. A method as recited in claim 1 further comprising the step of controlling a safety device in response to said pitch angle.

4. A method of detecting vehicle pitch angle as described in claim 1 further comprising:
   determining a pitch estimation error in response to a pre-calibrated function in response to steering wheel angle, vehicle speed, said yaw rate and lateral acceleration.

5. A method of detecting vehicle pitch angle as described in claim 4, wherein said step of determining said pitch estimation error comprises determining said pitch estimation error in response to the expression $\sin\theta = (a_y/g) \cdot (v_n/u)$ where:
   u is the longitudinal speed and,
   $a_x$ is the longitudinal acceleration, $v_n$ is a lateral velocity estimation error; and
   θ is the vehicle pitch angle.

6. A method of detecting vehicle pitch angle as recited in claim 5, wherein a pitch estimation bound is determined by the equation $(a_y/g) \cdot (v_n/u)$.

7. A method of detecting a vehicle pitch angle as described in claim 5, further comprising determining an estimated lateral velocity in response to a lateral velocity observer.

8. A method of detecting a vehicle pitch angle as described in claim 7, wherein said step of determining an estimated lateral velocity in response to a lateral velocity observer comprises determining the estimated lateral velocity in response to a vehicle speed, steering wheel angle, said yaw rate and a lateral acceleration.

9. A method of detecting a vehicle pitch angle as described in claim 7, wherein said step of determining an estimated lateral velocity comprises determining a lateral velocity estimation error.

10. A method of detecting a vehicle pitch angle as described in claim 1, further comprising calibrating said longitudinal acceleration signal, yaw rate signal, said lateral velocity signal.

11. A method of detecting a vehicle pitch angle as described in claim 10, wherein said calibrating comprises during a steady state, generating an adjustment signal.

12. A method of detecting a vehicle pitch angle as described in claim 11, wherein said step of generating an adjustment signal comprises deriving an adjustment signal in response to $$\tan\theta \approx -\omega_x/\omega_z$$

where θ is the pitch angle adjustment and $\omega_x$ is the vehicle roll rate and $\omega_z$ is the vehicle yaw rate.

13. A method of pitch alignment for sensors of an automotive vehicle, said method comprising:
   generating a yaw rate signal corresponding to vehicle yaw rate;
   generating a roll rate signal corresponding to vehicle roll rate;
   generating a lateral acceleration signal corresponding to vehicle lateral acceleration;
   determining when the vehicle is operating in a steady state turning condition;
   generating a pitch angle alignment θ when the vehicle is in the steady state turning condition where:

$$\theta \approx \omega_x + \tan\theta \cdot \omega_z$$

where $\omega_x$ and $\omega_z$ are said roll rate and yaw; and
   calibrating the yaw rate signal and the roll rate signal in response to the pitch angle alignment.

14. A control system for an automotive vehicle having a vehicle body comprising:
   a yaw rate sensor generating a yaw motion signal corresponding to a yaw motion of the vehicle body;
   a longitudinal accelerometer generating a longitudinal acceleration signal corresponding to a longitudinal acceleration of a center of gravity of the vehicle body;

a lateral velocity sensor generating a lateral velocity signal corresponding to the lateral velocity of the vehicle body; and a controller coupled to said yaw rate sensor, said longitudinal accelerometer and said lateral velocity sensor, said controller determining a longitudinal speed from said longitudinal acceleration signal, said controller determining a vehicle pitch angle in response to said longitudinal speed, said yaw rate signal and said lateral velocity signal.

15. A control system as recited in claim 14, further comprising a safety system coupled to said controller, said controller generating a control signal to said safety system in response to said vehicle pitch angle.

16. A control system as recited in claim 15, wherein said safety system comprises an active brake control system.

17. A control system as recited in claim 15, wherein said safety system comprises an active rear steering system.

18. A control system as recited in claim 15, wherein said safety system comprises an active front steering system.

19. A control system as recited in claim 15, wherein said safety system comprises an active anti-roll bar system.

20. A control system as recited in claim 15, wherein said safety system comprises an active suspension system.

* * * * *